United States Patent [19]
Lois

[11] 3,924,827
[45] Dec. 9, 1975

[54] APPARATUS FOR EXTRACTING ENERGY FROM WINDS AT SIGNIFICANT HEIGHT ABOVE THE SURFACE

[76] Inventor: Lambros Lois, 4857 Battery Lane, Apt. 406, Bethesda, Md. 20014

[22] Filed: Apr. 25, 1975

[21] Appl. No.: 571,632

[52] U.S. Cl.............. 244/153 R; 290/42; 290/55; 416/8; 416/64
[51] Int. Cl.² ....................................... B64C 31/06
[58] Field of Search............ 244/153 R, 33; 290/42, 290/43, 44, 52, 55; 416/8, 64, 79, 117, 118; 415/5

[56] References Cited
UNITED STATES PATENTS
| | | | |
|---|---|---|---|
| 3,730,643 | 5/1973 | Davison | 416/8 |
| 3,887,817 | 6/1975 | Steelman | 290/43 |

FOREIGN PATENTS OR APPLICATIONS
| | | | |
|---|---|---|---|
| 489,139 | 7/1938 | United Kingdom | 244/153 R |
| 518,068 | 2/1940 | United Kingdom | 244/33 |
| 466,172 | 10/1951 | Italy | 244/33 |

Primary Examiner—George E. A. Halvosa
Assistant Examiner—Paul E. Sauberer
Attorney, Agent, or Firm—Laurence, Stokes & Neilan

[57] ABSTRACT

A bouyant wing is tethered to a line an appreciable distance above the surface where the winds are at higher speed than at ground level, the other end of the line(s) is attached, for example, to an electrical generator, and provision is made for adjusting the position of the wing so that when a series of wings are utilized together with an electrical generator, one wing may be retracted while at least one other wing which is positioned to catch the wind is drawn away from the generator.

16 Claims, 9 Drawing Figures

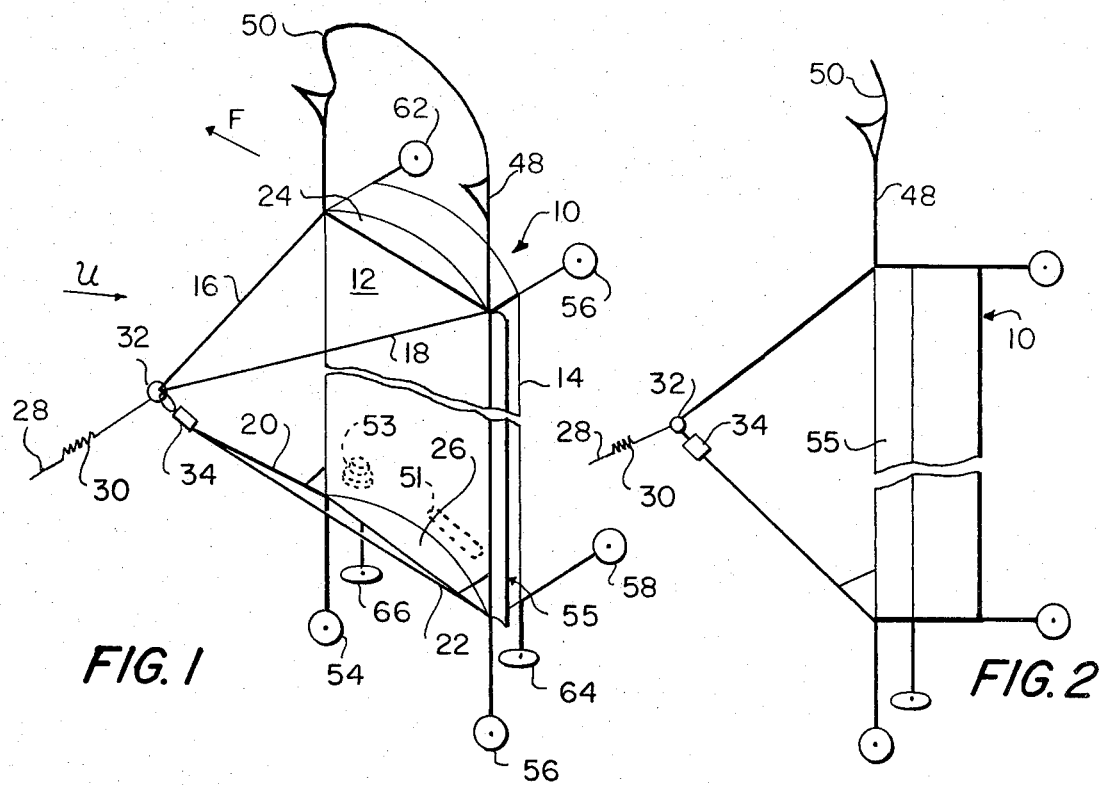
FIG. 1
FIG. 2
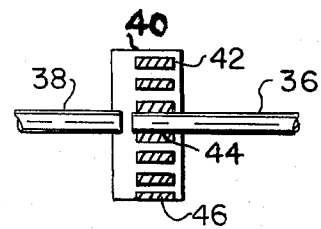
FIG. 3
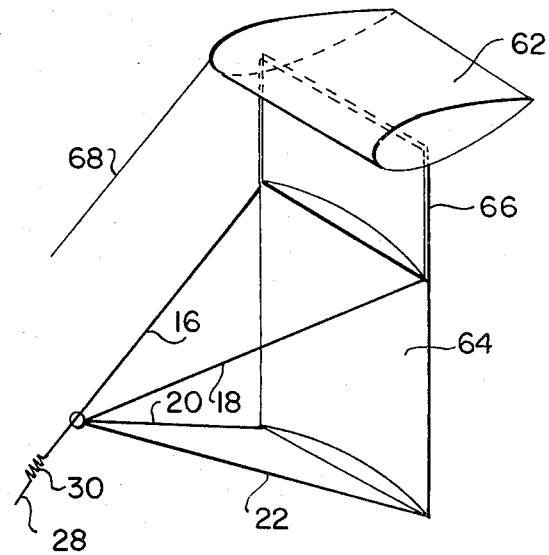
FIG. 4

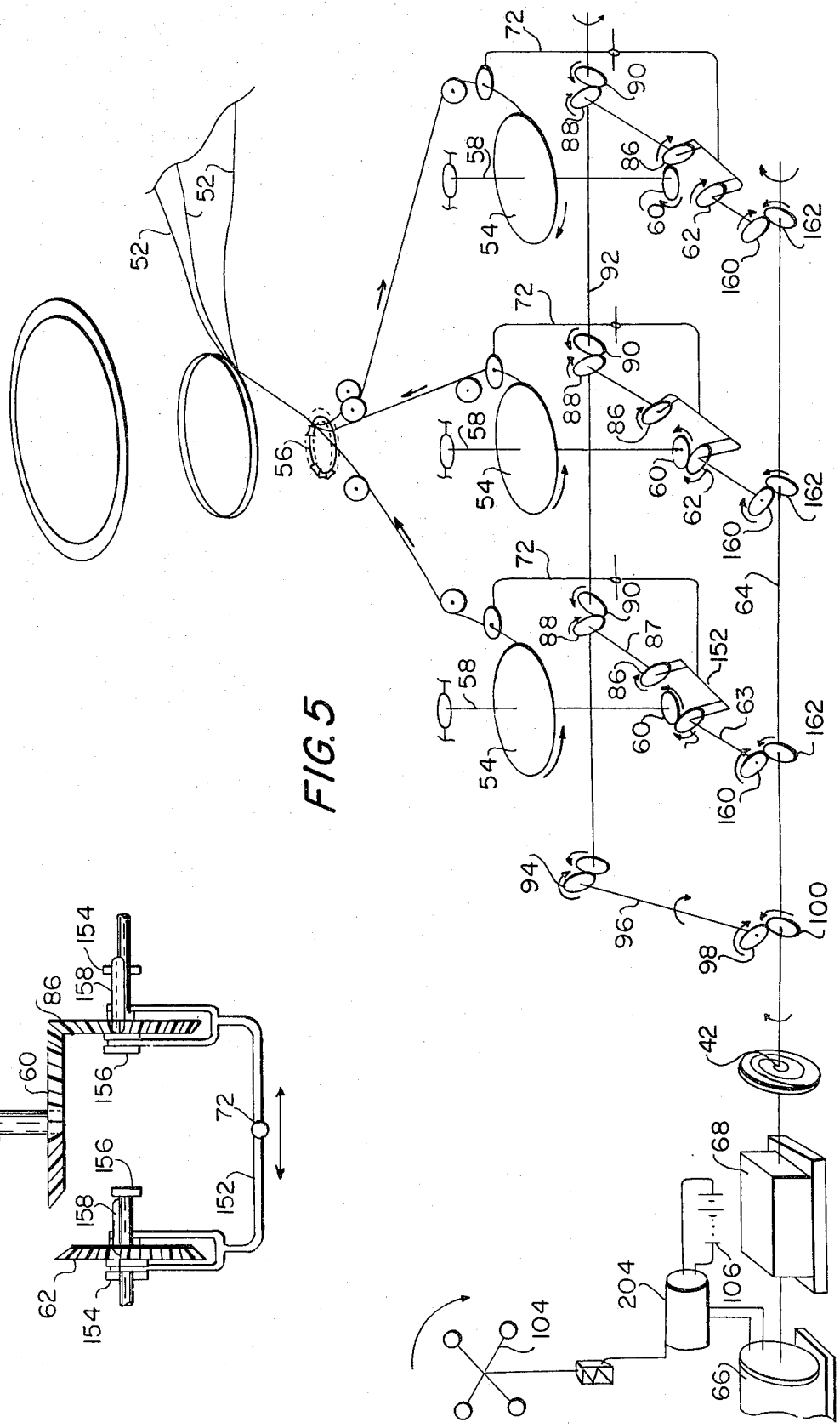

APPARATUS FOR EXTRACTING ENERGY FROM WINDS AT SIGNIFICANT HEIGHT ABOVE THE SURFACE

BACKGROUND OF THE INVENTION

The present invention relates to apparatus for extracting energy from the wind. More particularly, the present invention refers to an apparatus which utilizes a wing and/or sail which may be bouyant in its own right or which may be carried aloft by the configuration of the wing or sail. The wing is designed to be carried to a relatively high altitude of several hundred feet above the surface. In such regions, the wind velocity is considerably greater than at the surface and consequently the wind's energy density is higher. The wings are disposed at the end of a line for power transmission and/or controlling the orientation and relative position of the wing. Consequently the invention does not require the use of a mast or a large supporting tower as is the case with most propeller type windmills.

According to one embodiment of the invention, the wing is comprised of a hollow bouyant body filled with a lighter than air gas such as hydrogen or helium. The bouyant body has a concave surface facing the incoming wind and the body is designed to float in the atmosphere and lift with it the necessary holding, connecting, guiding and/or power transmitting line leading from the body to the ground level structure.

Another embodiment of the invention has an upper adjustable wing section with an appropriate angle of attack to lift and support the over-all structure, and a lower sail section which may consist of a single sheet of cloth or plastic designed to present a concave surface.

It is a feature of the invention that appropriate springs may be incorporated into the lines leading to the wing so that when gusts of wind are encountered, the wing may move in the direction of the wind flow stretching the springs so that additional energy is absorbed by the system.

A primary object of the present invention is to provide a novel system for extracting energy in an economical manner from the wind. Still another object of the invention is to provide an apparatus which is effective to harness the energy in the winds a considerable distance above ground level without the necessity of providing a rigid connecting structure from ground level to the desired altitude where higher velocity winds are present. Still another object of the invention is to provide a system whereby floating wings attached to one or more connecting lines will be alternately played out under the influence of the wind and then drawn back while presenting a smaller effective surface to the wind.

The above and other objects, features and advantages of the invention will become more apparent as this description proceeds.

BRIEF DESCRIPTION OF THE DRAWINGS

FIG. 1 is a perspective view of one embodiment of a bouyant wing in accordance with the present invention.

FIG. 2 is a side view of the wing of FIG. 1.

FIG. 3 is a cross sectional view of a spiral spring connection between a driver and driven shaft.

FIG. 4 is a perspective view of a wing in accordance with another embodiment of this invention.

FIG. 5 is a diagrammatic view showing power lines for a series of wings operatively connected to an electrical generator.

FIG. 6 is a detail illustration of gear arrangement which can be used for the reversal of rotation of the pulley of a wing.

DETAILED DESCRIPTION OF THE INVENTION

Figure 7:
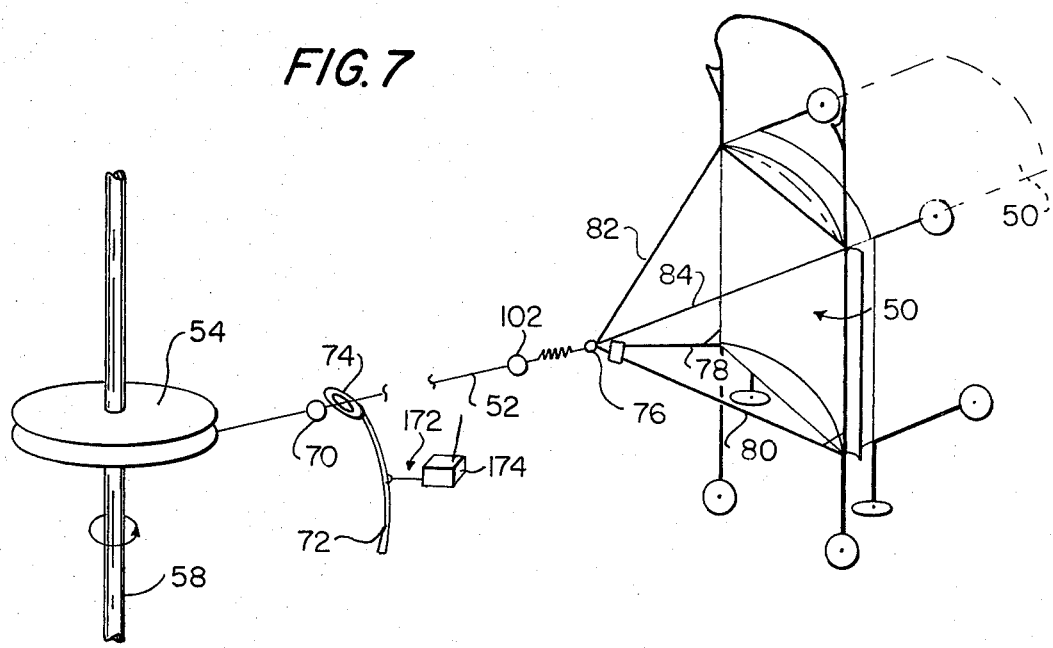
FIG. 7 is a diagrammatic illustration and enlargement of a portion of the apparatus of FIG. 6 showing a mechanism for reversing the direction of movement of the wing.

Referring now to the drawings and, more particularly, to FIG. 1, reference numeral 10 designates a floating, bouyant wing. The wing is hollow and is comprised of a gas impervious material such as plastic or the like and is constructed to have a concave surface 12 facing the wind and a convex rear surface 14. The wing is filled with a lighter than air gas such as hydrogen or helium so that it will rise of its own accord and take with it the attached control and power transmitting lines 16, 18 and solid member 20 and 22. It will be appreciated that the wing 10 is constructed in appropriate fashion to maintain the desired curved configuration, for example, sheets of plastic or the like of an arcuate configuration may be attached to the upper and lower peripheral surfaces of member 10 to form end pieces 24 and 26. The end pieces 24 and 26 serve to assist in forming a pocket to catch the incoming wind designated by the arrows. Lines 16 and 18 end at a ring 32 which is used to support members 20 and 22 through an electromagnetic device 34. A tether or control line 28 from the ground is also attached to ring 32. The wing when fully extended may reach a height of several hundred feet above the surface where the wind velocity is substantially greater than that at the surface and be several thousand feet downwind. By suitable adjustment of the length of the connecting lines as well as the configuration of the wing, the wing can be arranged so that a desired resultant force is achieved from the reaction of the wind upon the wing 10.

A spring 30 in line 28 adjacent the electromagnetic locking device 34 may be elongated when gusts of wind catch the wing. The spring functions to increase the efficiency of the floating wing since during gusts the wind velocity increases significantly for short periods of time. The resistance of the floating wing will increase but its speed will not increase to be at an optimum for energy extraction from the wind. The optimum wing velocity is approximately one-third the velocity of the wind. The spring 30 enables the gust to produce more useful work because the wing will be able to follow the gust and increase its speed by extending the spring, increasing tension in the spring, and accomplishing work that could not otherwise be achieved if the sail wing was attached to a rigid member. When the gust subsides, spring 30 tends to contract and give up energy to produce useful work, for example, to a power generator.

The same function that has just been described for spring 30 can also be accomplished with a spring which spirals around a shaft which powers an electric generator. This is shown in FIG. 3. A driving shaft 36 is attached to a flat coil spring 42 at point 44. The outer coil of the spring is attached at point 46 on the inside of a wheel or drum 40 which in turn is fastened to the driven shaft 38. The use of this connection and the addition to springs 30 of spring 42, with the generator will be demonstrated further in this description.

The wing 10 has a metal frame with a hook-like extension 50 upward from a solid member 48, the function of which is described later. The wing carries some appropriate means for its stabilization in the air. This can be accomplished by an appropriate formulation of the back of the wing so as to enhance it aerodynamic stability. Another means is to add a very low hanging weight which would lower the center of gravity of the structure to considerably below the center of bouyancy and so secure the stability of the sail in it flight. The later approach could be accomplished by hanging a long chain of the appropriate weight per unit length. This solution could also be used to control the height of the sail in its power producing part of the cycle and its return. The reason for this is that the weight of the chain increases when the sails ascends and with the appropriate weight per unit length there will be a height where the bouyancy will be equal to the total weight of the wing and the chain. The function of this weight proportional to the ascent could be substituted or exercised in whole or part by the power line. The wing will also include means to add or subtract the lighter than air gas which is used to fill the floating sail. This is necessitated from the following reasons: (a) to make up for losses of the filler gas (it is known that light gases such as hydrogen or helium have high permeability), (b) to compensate for changes in atmospheric pressure which could change the volume of the filler gas and therefore affect the sail's lifting capacity, (c) to compensate for changes of the volume of the filler gas due to changes in the atmospheric temperature and (d) to make certain that the internal pressure of the filler gas is greater than the atmospheric pressure. The last may be necessary if the filler gas is hydrogen to make sure that no atmospheric oxygen will enter and mix with the hydrogen which can lead into an explosive mixture. The above can be accomplished by attaching a bottle 51 (FIG. 1) of compressed hydrogen with a compressor of the appropriate size and a release valve. The object of (a), (b), (c), and (d) above is to keep the difference of the internal filler gas pressure a desired amount above the current atmospheric pressure. If this pressure differential is lower than the specified value the valve will open and release gas until the internal pressure is the specified amount over atmospheric. When the internal pressure is higher than the specified amount from the atmospheric then the compressor will recompress the gas into the bottle. If the gas can be released in the atmosphere, lowering of the internal pressure could be accomplished by another valve which would vent the filler gas to the atmosphere. If the filler gas is inexpensive such as hydrogen, the venting to the atmosphere valve may be preferable; but if the filler gas is the relatively expensive helium the former solution with the recompression may be preferred. The necessary power for the compressor could be supplied by ordinary batteries carried on board and a small motor 53 or by a pair of electric leads which follow the sail and are connected to an appropriate electrical outlet on the ground.

Another measure which will aid the proper function and operation of the wing is a heater to maintain the filler gas temperature a few degrees above 32°F when there is falling snow or freezing rain. The reason is that there should be no appreciable accumulation of snow or ice on the wing. This could amount to substantial weight over the area of the wing and affect its performance or even prevent it from becoming airborne. This can be accomplished by an electrical heater or a combustion heater. An electrical heater could be powered by batteries carried on board or be connected via an appropriate length electrical line to an outlet on the ground. Some of the equipment mentioned above and specifically spring 30 and the gas release valve from the compressed gas bottle, can serve dual functions. Spring 30 aside from its described function as an energy storage device in the short instances of the wind gusts will act also as a "shock absorber" at the end of the rewind run which will be described later. The gas release valve will act as a leak-detector or leak-indicator if it is equipped with an appropriate alarm which will be triggered by a time measuring device (which will be automatically reset with the closing of the valve). When the valve remains open longer than a certain length of time and the pressure does not rise sufficiently to close the valve, the alarm will be triggered as an indication of a leak. Either of the valves mentioned above, i.e., the valve which releases the compressed gas into the wing or the valve which relieves the pressure to the atmosphere (or the recompression action of the compressor) can be triggered by a proximity to ground mechanism if this if found necessary and/or expedient. The necessary instruments for the above described functions such as manometers, voltmeters, ammeters, etc. will also be carried on board. It is obvious that under the influence or force of the wind in a specific location, the wing will be moving in a vertical plane including the vector of the wind passing through the point of the line connection in the ground. However, it is conceivable that an incoming sail may interfere with an outgoing sail or their power transmitting lines may become entangled. To avoid this situation, it would be desirable to have the plane of motion of two successive wings slightly different. This can be accomplished in two different ways. One way is by attaching a side deflecting panel 55 to wing 10 which will develop a sideways force in the direction of vector F. The succeeding wing sail will bear the corresponding deflecting plane on the other side developing an equal deflecting force F but of opposite direction. Another approach changes the length of the lines 18 and 22 with respect to that of lines 16 and 20. If 18 and 22 are somewhat linger the wing sail will not be hit by the wind exactly in the middle, i.e. in a symmetrical way, rather the wind will hit the wing off center and so develope a sideways component of force. If lines 16 and 20 are longer than 18 and 22 the sideways force will be in opposite direction.

Another feature of the wing is a number of members which will prevent it from suffering damage in case it is grounded because of a leak and loss of the filler gas, because of excessive accumulation of snow or ice or because of some other reason. Such means are shown in FIG. 1 as wheels 54, 56, 58, 60, and 62 or floaters 64 and 66. The floaters are shorter than the wheels. The wheels extend from below and the back of the wing the front and upper parts are already protected from existing solid members.

Referring to FIG. 4, another embodiment of the invention comprises an upper hollow wing section 62 and a lower sail section 64 connected to each other by a light framework 66. In addition to lines 16 and 18, and lines 20 and 22, as in the first discussed embodiment, there is a control line 68 leading from the ground to the wing section 62. Via the control line 68 the angle of attack of the wing section may be varied, and increasing the angle of attack increases the lift component resulting from the wind acting on the wing section 62. Conversely, decreasing the angle of attack to a small value will cause the structure to fall. It will be appreciated this structure cannot operate at very low wind velocities. A threshold wind velocity below which this embodiment will not become airborne depends upon such factors as the weight of the structure and of the lines and the angle of attack. It is estimated that wind velocities in the order of five to seven miles per hour will be required to make the structure of the size contemplated airborne.

In case this embodiment is grounded appropriate solid members will keep it upright in such a way as to be able to become airborne again when the wind assumes proper velocities.

FIG. 5 illustrates a system for converting wind energy to electrical energy. In this system a plurality of wings which may be any of the embodiments of the invention are employed. For purposes of illustration only, three control and power transmission lines 52 are shown leading to wings (not shown in this figure), and each line is attached to a pulley 54 at its other end. The three wings shown above are in a system of three wings. A system could have many wings. The lines 52 are played out through a ring member 56 which is comprised of a plurality of small rotatable sections which reduce friction as the line moves over one of these segments. When the respective wing 50 is being drawn away from its pulley by the wind, the translational motion of the wing is converted to rotational motion of the respective pulley 54. At this time the pulley is in engagement with a counter clockwise rotating shaft 58 when viewed from above. Each shaft 58 is designed via bevel gears 60 and 62, shaft 63, and bevel gears 160 and 162 to impart rotation to a shaft 64 which is connected to an electrical generator 66 through a gear box 68 and a flat coil spring 42 such as that shown in FIG. 3.

At the completion of an energy-producing part of the cycle involving a given wing 50, i.e. when the line 52 leading to that wing is fully played out, it is necessary to retract the line onto its pulley 54 preparatory to the start of another cycle. One way this retraction may be accomplished is illustrated in FIG. 7. A knot 70 adjacent the lower end of line 52 is positioned to actuate a lever arm 72 via the knot abutting against eyelet member 74. Actuation of the lever arm 72 results in the opening of a latch 76 which may be an electromagnetic latch operated remotely by a switch 172 on an appropriate transmission equipment 174 so that lower lines 78 and 80 leading to the wing 50 are released. This permits the wing to pivot upwardly to the dash line position in which it is attached to line 52 only via connecting lines 82 and 84. In this position only the end corresponding to the upper end of the wing is presented to the wind and consequently there is less resistance.

At the same time that the wing 50 pivots to the dash line position for retraction, lever arm 72 actuates engagement of gear 60 of pulley 54 with a bevel gear 86 which causes rotation in the opposite direction for shaft 58. Consequently, the direction of rotation of pulley 54 is changed and the line 52 is rewound onto the pulley.

As seen in FIG. 5, the other end of the shaft 87 of gear 86 has a bevel gear 88 engaging bevel gear 90 on a shaft 92. Shaft 92 is connected via bevel gear unit 94 to a driven shaft 96 which is driven via a bevel 98 engaging bevel gear 100 on the shaft 64. Consequently, rotation of the shaft 64 via one or more of the wings moving outwardly under the influence of the wind not only powers the electrical generator 66 but a portion of the energy is utilized to rotate shafts 96 and 92, and gears 86 and 88 so that shaft 58 is rotated in the opposite direction and the line is rewound on the pulley. It will be understood that other comparable gear and/or clutch mechanisms may be utilized to permit sequential reversal in direction of rotation of the pulleys 54 to permit playing out and retraction of the wings. Likewise mechanisms can be used utilizing electrical and/or electromic means.

FIG. 6 shows in greater detail the mechanism which can be used to reverse the rotational motion of pulley 54 and shaft 58 shown in FIG. 5. Member 152 is forked at both ends and around the shafts of bevel gears 62 and 86. (See also FIG. 5). Member 152 is solidly connected to lever 72 which is activated by knots 70 and 102 in opposite directions. The motion of lever 72 results in the motion of 152 as indicated by the double arrow of FIG. 6. Gears 62 and 86 are splined to their shafts to permit sliding movement. At one end of this motion, gear 60 engages gear 86 and at the other end it engages gear 62. This results in reversal of the motion of the shaft 158 and pulley 54. The shafts of the gears 62 and 86 are appropriately grooved and equipped with an appropriate solid piece 58 in the groove so as to allow longitudinal motion but not rotational. Appropriate stops 154, 156 to limit the extent of the longitudinal motion are provided.

When retraction of a wing 50 is completed, an actuating member on the line such as a knot 102 (FIG. 7) engages the lever arm 72 which causes disengagement of pulley 54 and gear 60 from gear 86 and places the pulley and gear 60 into engagement with gear 62 to commence another cycle of playing out line 52 and the wing which initiates the power-harnessing portion of the cycle. As stated above, for optimum recapture by the wings, the speed of the wings should be about one-third the speed of the wind. In order to maintain such a relationship with varying wind velocities, a wind speed meter 104 (FIG. 5) may be employed to sense the wind velocity. A signal proportional to the wind velocity is passed to an excitation regulator 204 which is provided with current from a battery 106. The regulator 204 is connected to the windings of generator 66 so that when there is a change in wind velocity, a corresponding change in the rate of movement of the lines leading to the wings may be accomplished by changing the speed of rotation of shaft 64 due to an appropriate change of the field excitation of the generator and hence the torque of the generator.

The wind velocity meter also prevents damage of the system and of the wings for example, when the wind is too strong and the forces on the wings could be of destructive magnitude. This can be accomplished by an automatic activation of latches 34 FIG. 2 which will then immediately place the wings in the horizontal position and greatly diminish the wind force on them. This can be done by a transmitter 174 FIG. 7 which is activated when the wind velocity exceeds a certain value. To resume operation after such shutdown the outgoing wings have to be restored in their upright position. The above emergency unlatching of latch 34 can also be accomplished by designing the latch to release when the force is greater than a given value.

Figure 8:
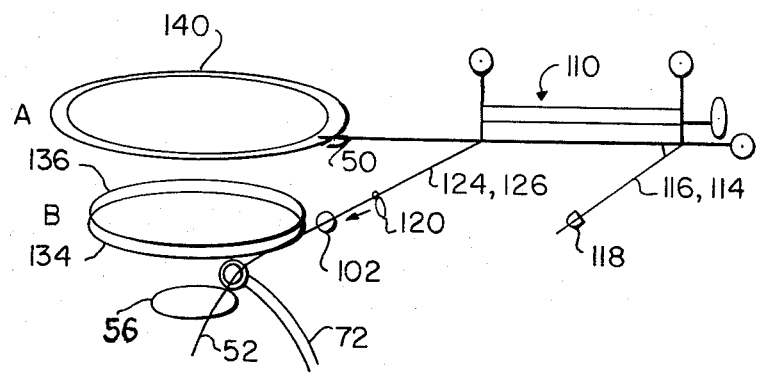
FIG. 8 is a view of the wing of the point where the process of uprighting begins at the end of retraction.
Figure 9:
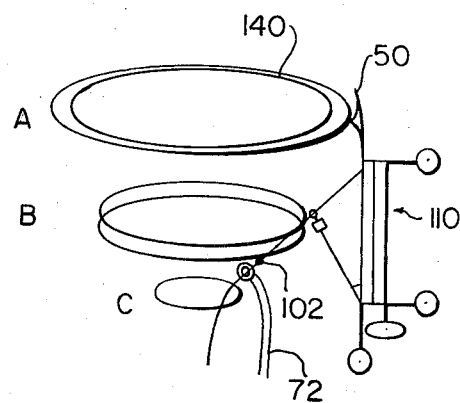
FIG. 9 is a view of the wing similar to FIG. 8 but at the end of the uprighting and ready to begin a new power cycle.

The relatching (closing) of latch 76 and the return of the wing to the upright position to resume the power producing part of the cycle described above is accomplished as illustrated in FIGS. 8 and 9. Line 52 leading to the wing 110 passes up through lower ring 56 (see also FIG. 5) up through a larger ring 134 and out through the annulus between that ring and a closely adjacent upper ring 136 of the same size. This annulus acts as guide for line 52. Mounted above ring 136 on an appropriate support member is a larger ring 140. The ring 140 is positioned so that upon retraction of the line and as the wing 110 nears the fully retracted position, hook 50 engages the perimeter of ring 140, as shown in FIG. 8. Now further retraction of the line results in the wing 110 swinging downwardly pivoting about a fulcrum formed by the contact of hook member 50 on ring 140 to the position illustrated in FIG. 9 where the latch 118 engages ring 120. The activation of the latch for the closing action is accomplished by the activation of switch 172 of transmitter 174 shown in FIG. 7 which moves in the opposite sense than before from knot 102 through eyelet 74 of FIGS. 7, 8, 9. At this point the tubular support members 114 and 116 along with lines 124 and 126 are in position to hold the wing so that surface 112 is presented to the wind. Now the knot 102 engaging against the lever arm 74 or similar device is effective to reverse the rotation of the pulley upon which the line has been rewound to commence another cycle of operation.

From the above description it is obvious that the entire installation could be on land or over water. The only requirements are: (a) a well founded structure to support rings 56, shafts 58, FIG. 5, and other members which will bear the forces from the wings through lines 52, and (b) that the terrain does not present obstacles to the motion or flight path of the wings. Therefore shallow water in a lake or in the sea could be suitable for such an installation.

The wing construction makes it in essence a specialized instrument to extract, in an optimum fashion, energy from the wind. It is shaped, supported and operated for this purpose, and many supportive functions are provided to accomplish this goal.

Although presently preferred embodiments of the invention have been shown and described with particularity, it will be appreciated that various changes and modifications may suggest themselves to those of ordinary skill in the art upon being apprised of the present invention. Also the illustrated embodiments are intended to be illustrative and not limiting. Accordingly, it is intended to encompass all such changes and modifications as fall within the scope and spirit of the appended claims.

I claim:

1. Apparatus for harnessing energy from atmospheric winds, comprising a plurality of floating wings, each wing being connected to a flexible line, the other end of each flexible line being wound upon a respective pulley, means including shaft means connecting said pulleys to energy utilization means for utilizing energy extracted from the wind by playing out of said lines and said wings under the influence of the wind, and means to reverse the direction of rotation of the pulleys in sequence to sequentially retract a wing and its respective line.

2. Apparatus according to claim 1, wherein said energy utilization means comprises an electrical generator.

3. Apparatus according to claim 2, further comprising means to sense the wind velocity, and control means to vary the rate of rotation of said pulleys as their respective lines are being played out so that the velocity of said wings is approximately one-third of the wind velocity.

4. Apparatus according to claim 1, further comprising means to adjust the orientation of said wings to present a smaller area to the wind during retraction of said wings.

5. Apparatus according to claim 4, wherein said last mentioned means include electromagnetic actuated latch means.

6. Apparatus according to claim 1, wherein said means to reverse the direction of rotation of said pulleys comprise indicator members attached adjacent opposite ends of said lines.

7. Apparatus according to claim 1, further comprising an abutment member positioned adjacent said pulleys, and a hook member attached to each wing and having a portion to engage said abutment member upon retraction and effective to pivot said wing to a position to commence another cycle of operation.

8. Apparatus according to claim 1, wherein said wings comprise hollow buoyant members filled with a lighter than air gas.

9. Apparatus according to claim 8, further comprising buoyancy maintaining means disposed within said wings.

10. Apparatus according to claim 9, wherein said last mentioned means comprise a pressurized source of said gas.

11. Apparatus according to claim 1, wherein said wings comprise an upper adjustable wing section and a lower sail section presenting a concave surface to the direction of the wind.

12. Apparatus according to claim 11, further comprising a control line connected to said wing section to vary its angle of attack.

13. Apparatus according to claim 1, further comprising spring means incorporated in said lines, said spring means elongating in response to wind gusts striking said wings.

14. Apparatus according to claim 1, further comprising protective means attached to said wings and projecting outwardly from the surface of said wings to protect said wings upon falling to earth.

15. Apparatus according to claim 1, further comprising means attached to said wings and limiting the height of operation of said wings.

16. Apparatus according to claim 1, further comprising means attached to said wings and affecting the path of operation of said wings.

* * * * *